United States Patent
Uysal et al.

(10) Patent No.: US 10,020,882 B2
(45) Date of Patent: Jul. 10, 2018

(54) ADAPTIVE MULTIPLE INPUT MULTIPLE OUTPUT (MIMO) OPTICAL ORTHOGONAL FREQUENCY DIVISION MULTIPLEXING (O-OFDM) BASED VISIBLE LIGHT COMMUNICATION

(71) Applicants: OZYEGIN UNIVERSITESI, Istanbul (TR); ISTANBUL MEDIPOL UNIVERSITESI, Istanbul (TR)

(72) Inventors: Murat Uysal, Istanbul (TR); Omer Narmanlioglu, Istanbul (TR); Tuncer Baykas, Istanbul (TR); Refik Caglar Kizilirmak, Astana (KZ)

(73) Assignees: OZYEGIN UNIVERSITESI, Istanbul (TR); ISTANBUL MEDIPOL UNIVERSITESI, Istanbul (TR)

( * ) Notice: Subject to any disclaimer, the term of this patent is extended or adjusted under 35 U.S.C. 154(b) by 0 days.

(21) Appl. No.: 15/398,197

(22) Filed: Jan. 4, 2017

(65) Prior Publication Data
US 2017/0201321 A1    Jul. 13, 2017

Related U.S. Application Data

(60) Provisional application No. 62/276,091, filed on Jan. 7, 2016.

(51) Int. Cl.
*H04B 10/00* (2013.01)
*H04B 10/116* (2013.01)
(Continued)

(52) U.S. Cl.
CPC ......... *H04B 10/116* (2013.01); *H04B 7/0413* (2013.01); *H04B 10/516* (2013.01);
(Continued)

(58) Field of Classification Search
CPC .. H04B 10/116; H04B 7/0413; H04B 10/516; H04L 1/0001; H04L 25/0202; H04L 27/2697; H04L 1/0009; H04L 1/0003
(Continued)

(56) References Cited

U.S. PATENT DOCUMENTS 7,103,325 B1    9/2006  Jia et al.
7,623,588 B2   11/2009  Park et al.
(Continued)

OTHER PUBLICATIONS

Narmanlioglu, "Link Adaptation for MIMO OFDM Visible Light Communication Systems" IEEE Access (vol. 5) pp. 26006-26014. Date Nov. 13, 2017.*
(Continued)

*Primary Examiner* — Juan A Torres
(74) *Attorney, Agent, or Firm* — Egbert Law Offices, PLLC

(57) ABSTRACT

Systems and methods for adaptive multiple input multiple output (MIMO) optical orthogonal frequency division multiplexing (O-OFDM) visible light communication (VLC) involving adaptively choosing modulation type, modulation order, MIMO configuration, and MIMO type. A receiver estimates channel information, and based on the channel information, an adaptive controller makes a selection of transmission mode and provides feedback to a transmitter, which uses a set of transmission parameters indicated in the transmission mode feedback. MIMO O-OFDM VLC provides diversity gain (i.e., higher link reliability or better coverage range) and/or multiplexing gain (i.e., higher data rate).

18 Claims, 7 Drawing Sheets

(51) Int. Cl.
H04B 10/516 (2013.01)
H04B 7/0413 (2017.01)
H04L 25/02 (2006.01)
H04L 1/00 (2006.01)
H04L 27/26 (2006.01)

(52) U.S. Cl.
CPC ........ H04L 1/0001 (2013.01); H04L 25/0202 (2013.01); *H04L 1/0003* (2013.01); *H04L 1/0009* (2013.01); *H04L 27/2697* (2013.01)

(58) Field of Classification Search
USPC ........................................ 398/118
See application file for complete search history.

(56) References Cited

U.S. PATENT DOCUMENTS

| | | | |
|---|---|---|---|
| 7,693,428 B2* | 4/2010 | Khurgin | H04B 10/61 398/183 |
| 7,782,573 B2* | 8/2010 | Zhou | H04B 7/0417 360/260 |
| 8,270,512 B2 | 9/2012 | Ozluturk et al. | |
| 8,330,379 B2 | 12/2012 | Schenk et al. | |
| 8,451,951 B2* | 5/2013 | Caire | H04L 1/0003 375/340 |
| 2004/0132496 A1 | 7/2004 | Kim et al. | |
| 2006/0115014 A1* | 6/2006 | Jeong | H04B 7/061 375/267 |
| 2011/0310951 A1* | 12/2011 | Cvijetic | H04B 10/548 375/233 |
| 2012/0320869 A1 | 12/2012 | Stadelmeier et al. | |

OTHER PUBLICATIONS

Vucic, J., Kottke, C., Nerreter, S., Langer, K. and Walewski, J. 2010. "513 Mbit/s Visible Light Communications Link Based on DMT-Modulation of a White LED". J. Lightwave Technol. 28(24), 3512-3518.

Tian, C., Li, Y., Ye, W., Quan, X., Song, Z. and Zheng, C. 2011. "Performance study of an OFDM visible light communication system based on white LED array". Optoelectronics Letters, 7(6), 454-457.

Khalid, A., Cossu, G., Corsini, R., Choudhury, P. and Ciaramella, E. 2012. "1-Gb/s Transmission over a Phosphorescent White LED by Using Rate-Adaptive Discrete Multitone Modulation". IEEE Photonics J., 4(5), 1465-1473.

Cossu, G., Khalid, A., Choudhury, P., Corsini, R. and Ciaramella, E. 2012. "3.4 Gbit/s visible optical wireless transmission based on RGB LED". Opt. Express, 20(26), B501.

Cossu, G., Wajahat, A., Corsini, R. and Ciaramella, E. 2014. "5.6 Gb/s downlink and 1.5 Gb/s uplink optical wireless transmission at indoor distance (1.5 m)". Proc. 40th ECOC, 1-3.

Chun, H. et al. 2014. "Visible light communication using a blue GaN uLED and fluorescent polymer color converter". IEEE Photon. Technol. Lett., 26(20), 2035-2038.

Ki-Hong Park, Young-Chai Ko, and Alouini, M. 2013 "On the Power and Offset Allocation for Rate Adaptation of Spatial Multiplexing in Optical Wireless MIMO Channels". IEEE Transactions on Communications, 61(4), 1535-1543.

Chow, C., Yeh, C., Liu, Y., Huang, P. and Liu, Y. 2013. "Adaptive scheme for maintaining the performance of the in-home white-LED visible light wireless communications using OFDM". Optics Communications, 292, 49-52.

Yeh, C., Chow, C., Chen, H., Chen, J. and Liu, Y. 2014. "Adaptive 84.44-190 Mbit/s phosphor-LED wireless communication utilizing no blue filter at practical transmission distance". Opt. Express, 22(8), 9783.

Tsonev, D., Hyunchae Chun, Rajbhandari, S., McKendry, J.., Videv, S., Gu, E., Haji, M., Watson, S., Kelly, A.E., Faulkner, G., Dawson, M.D., Haas, H., O'Brien, D. 2014. "A 3-Gb/s Single-LED OFDM-Based Wireless VLC Link Using a Gallium Nitride MicroLEDs". IEEE Photonics Technology Letters, IEEE, 26(7), 637-640.

Fahamuel, P., Thompson, J., Haas, H. 2014. "Improved indoor VLC MIMO channel capacity using mobile receiver with angular diversity detectors". IEEE Global Communications Conference (GLOBECOM), 2060-2065.

Huang, X., Chen, S., Wang, Z., Shi, J., Wang, Y., Xiao, J. and Chi, N. 2015. "2.0-Gb/s Visible Light Link Based on Adaptive Bit Allocation OFDM of a Single Phosphorescent White LED". IEEE Photonics J., 7(5), 1-8.

Wang, M., Wu, J., Yu, W., Wang, H., Li, J., Shi, J. and Luo, C. 2015. "Efficient coding modulation and seamless rate adaptation for visible light communications". IEEE Wireless Communication 22(2), 86-93.

Li, J., Huang, Z., Liu, X. and Ji, Y. 2015. "Hybrid time-frequency domain equalization for LED nonlinearity mitigation in OFDM-based VLC systems". Opt. Express, 23(1), 611.

Wu, L., Zhang, Z., Dang, J. and Liu, H. 2015. "Adaptive Modulation Schemes for Visible Light Communications". J. Lightwave Technol., 33(1), 117-125.

Ijaz, M. et al. 2015. "Experimental proof-of-concept of optical spatial modulation OFDM using micro LEDs". IEEE International Conference on Communication Workshop (ICCW), 1338-1343.

T. Fath and H. Haas. 2013. "Performance Comparison of MIMO Techniques for Optical Wireless Communications in Indoor Environments." IEEE Transactions on Communications, 61(2).

S. Catreux, V. Erceg, and R. Heath, "Adaptive modulation and MIMO coding for broadband wireless data networks," IEEE Commun. Mag., vol. 40, pp. 108-115, Jun. 2002.

* cited by examiner

| Adaptive Transmission Mode | MIMO Configuration | MIMO Type | Modulation Type | Modulation Order | Performance Metric | Constraint Metric |
|---|---|---|---|---|---|---|
| 1 | 1x1 ($1^{st}$ LED, $1^{st}$ PD) | RC | PSK | 2 | Pre-determined values for performance metric according to the quality-of-service (QoS) requirements for targeted applications | Pre-determined values for constraint metric according to the quality-of-service (QoS) requirements for targeted applications |
| 2 | . | SMUX | QAM | 4 | | |
| 3 | . | SMUD | | 8 | | |
| 4 | 1x1 ($1^{st}$ LED, $M^{th}$ PD) 1x1 ($2^{nd}$ LED, $1^{st}$ PD) . . . | (Other MIMO types can be supported) | (Other linear modulation types can be supported) | 16 32 64 128 256 512 1024 . | | |
| . | 1x2 ($1^{st}$ LED, $1^{st}$ and $2^{nd}$ PD) | | | | | |
| . | 1x2 ($1^{st}$ LED, $1^{st}$ and $3^{rd}$ PD) | | | | | |
| . | 1x2 (.........) | | | | | |
| . | 2x1 (.........) | | | | | |
| . | 2x1 (.........) | | | | | |
| . | 2x2 (.........) | | | | | |
| . | MxN (all LEDs, all PDs) | | | | | |

FIG. 5

ADAPTIVE MULTIPLE INPUT MULTIPLE OUTPUT (MIMO) OPTICAL ORTHOGONAL FREQUENCY DIVISION MULTIPLEXING (O-OFDM) BASED VISIBLE LIGHT COMMUNICATION

CROSS-REFERENCE TO RELATED U.S. APPLICATIONS

The present disclosure claims priority to U.S. Provisional Application No. 62/276,091 filed on Jan. 7, 2016, the disclosure of which is incorporated by reference herein for all purposes.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to visible light communication (VLC), and more particularly to multi-input multi-output (MIMO) orthogonal frequency division multiplexing (OFDM) VLC.

2. Description of Related Art Including Information Disclosed Under 37 CFR 1.97 And 37 CFR 1.98.

Visible light communication (VLC) is a short range optical wireless data transmission method that uses the illumination infrastructure as wireless access points. VLC systems are based on the principle of modulating light emitting diodes (LEDs) at very high speeds without any adverse effects on the human eye and illumination levels. LEDs are increasingly used both indoors (e.g., home and office lighting, etc.) and outdoors (e.g., street lights, traffic lights, vehicle front/rear lights, etc.). VLC uses 380-790 THz frequency bands and advantageously provides a signal not easily disturbed between a transmitter and a receiver.

The dual use of LEDs for both lighting and communication purposes is a revolutionary solution and has the potential to open a new era in wireless communications. The design of ultra-high-speed VLC systems (on the order of multiple gigabits per second) requires the development of advanced and custom-designed physical layer technologies taking into account the inherent characteristics of optical signal propagation.

Initial research and development in VLC has included non-adaptive systems which use fixed transmission parameters. Such systems fail to provide a satisfactory performance in time-varying channel conditions.

Adaptive radio-frequency (RF) wireless systems have been previously used in practice. However, such works have been designed for RF frequencies and cannot be applied to VLC systems with different sets of requirements and inherently different characteristics. For example, unlike RF signals, optical signals must be real and non-negative. Furthermore, VLC systems need to be designed taking into account their dual use; i.e., the functional use for illumination as well as communication.

Adaptive transmission in the context of VLC has been explored. Some of this research assumes single-carrier transmission under the assumption of frequency-flat channels. This is not realistic for the targeted ultra-high speeds on the order of gigabits per second.

Multipath VLC channels will exhibit frequency-selectivity at high data speeds and result in severe intersymbol interference (ISI). To handle this, adaptive VLC systems are built upon multi-carrier architecture and deploy orthogonal frequency division multiplexing (OFDM). In this technique, the high-rate data stream is de-multiplexed and transmitted over a number of frequency subcarriers. If appended cyclic prefix duration is larger than the delay spread, ISI can be neglected simplifying the receiver complexity. Different from its RF counterparts, the implementation of optical OFDM (O-OFDM) requires certain modifications to ensure the non-negativity of the intensity-modulated optical signal.

Previous research considers the combination of multi-input multi-output (MIMO) and OFDM, but this research has often been for non-adaptive systems or for a fixed MIMO type (i.e., spatial modulation, and the MIMO type is not changed in an optimal manner).

As a result of the above-mentioned drawbacks and the insufficiencies of previous solutions in VLC, improvements are required to be made in the related technical field.

BRIEF SUMMARY OF THE INVENTION

To address challenges and requirements for the new generation of VLC modems, the present disclosure presents new methods and systems for adaptive VLC where several transmission parameters such as modulation size/order, type, and configuration of MIMO communication techniques are optimally adjusted according to channel conditions. The present disclosure will significantly enhance VLC system performance and efficiencies.

In accordance with embodiments of the invention, advantageous use of MIMO techniques in adaptive OFDM VLC systems are disclosed. Systems and methods for adaptive MIMO OFDM VLC involves adaptively choosing modulation type, modulation order, MIMO configuration, and MIMO type. A receiver estimates channel information, and based on the channel information, an adaptive controller makes a selection of transmission mode and provides feedback to a transmitter, which uses a set of transmission parameters indicated in the transmission mode feedback. MIMO techniques can bring diversity gain (i.e., higher link reliability or better coverage range) and/or multiplexing gain (i.e., higher data rate). In accordance with an embodiment, the system considers three main MIMO transmission types, specifically, repetition code (RC), spatial multiplexing (SMUX), and spatial modulation (SMUD), and then uses the MIMO type and configuration as an adaptation parameter in addition to modulation type and modulation order. Various other MIMO techniques may be supported in addition to these three main types.

The present disclosure is particularly useful for mobile users. For example, in an indoor environment, the received signal strength varies as the user walks. After estimating the channel state information (such as channel coefficients, channel correlations, signal-to-noise-ratio, etc.), according to the current channel conditions, the receiver selects the optimal transmission parameters (i.e., modulation type, modulation order, MIMO configuration, and MIMO type)

that yield the highest performance metric under a given constraint metric and feeds the selected optimal transmission parameters (or an indicator of such parameters) back to the transmitter. To further improve system performance, bit-loading may be performed with respect to frequency-selective channel response and selected modulation order such that the subcarriers that have high attenuation are re-modulated with lower modulation orders than the selected order and similarly, the subcarrier that have low attenuation are re-modulated with higher orders.

In accordance with an embodiment of the present disclosure, a visible light communication (VLC) transmitter is disclosed. The VLC transmitter comprises: an optical orthogonal frequency division multiplexing (O-OFDM) modulator configured to process digital data; a plurality of light emitting diodes (LEDs) operably coupled to the O-OFDM modulator, the plurality of LEDs configured to transmit the processed digital data to a plurality of photodetectors (PDs) at a receiver; and a feedback channel operably coupled to the O-OFDM modulator, the feedback channel configured to receive feedback data from an adaptive transmission controller at the receiver, the feedback data including an optimized adaptive transmission mode indicator identifying a combination of adaptive transmission parameters including at least multiple input multiple output (MIMO) configuration, MIMO type, modulation type, and modulation order.

In accordance with another embodiment, a VLC receiver is disclosed. The VLC receiver comprises: a plurality of photodetectors (PDs) configured to receive analog data from a plurality of light emitting diodes (LEDs) at a transmitter; an optical orthogonal frequency division multiplexing (O-OFDM) demodulator operably coupled to the plurality of PDs, the O-OFDM configured to process the received analog data; a channel estimator operably coupled to the O-OFDM demodulator, the channel estimator configured to estimate channel state information; an adaptive transmission controller operably coupled to the O-OFDM demodulator and the channel estimator, the adaptive transmission controller configured to provide feedback data; and a feedback channel operably coupled to the O-OFDM modulator, the feedback channel configured to transfer feedback data from the adaptive transmission controller, the feedback data including an optimized adaptive transmission mode indicator identifying a combination of adaptive transmission parameters including at least multiple input multiple output (MIMO) configuration, MIMO type, modulation type, and modulation order.

In accordance with yet another embodiment of the present disclosure, a method of data transmission via VLC is disclosed. The method comprises: constructing a look-up table with adaptive transmission modes, each adaptive transmission mode including a combination of adaptive transmission parameters including at least multiple input multiple output (MIMO) configuration, MIMO type, modulation type, and modulation order; setting a performance metric for each of the possible adaptive transmission modes; estimating channel state information; setting a constraint metric for each of the possible adaptive transmission modes based at least in part on the channel state information; constructing a list of adaptive transmission modes that each satisfy a respective constraint metric; selecting the adaptive transmission mode with the highest performance metric; and providing feedback data from a receiver to a transmitter, the feedback data including an optimized adaptive transmission mode indicator identifying the selected adaptive transmission mode with the highest performance metric.

Advantageously, the systems and methods of the present disclosure provide highly adaptive protocols resulting in significantly enhanced VLC system performance and efficiencies.

BRIEF DESCRIPTION OF THE SEVERAL VIEWS OF THE DRAWINGS

Systems and methods according to the invention and some particular embodiments thereof will be described with reference to the following figures. These and other features, aspects, and advantages of the present invention will become better understood when the following detailed description is read with reference to the accompanying drawings in which like characters represent like parts throughout the drawings. Some embodiments are illustrated by way of example and not limitation in the figures of the accompanying drawings. Unless noted, the drawings may not be drawn to scale.

FIG. 5 illustrates a look-up table (LUT) in accordance with embodiments of the present disclosure.

DETAILED DESCRIPTION OF THE INVENTION

Various modifications to the example embodiments set forth herein will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

Figure 1:
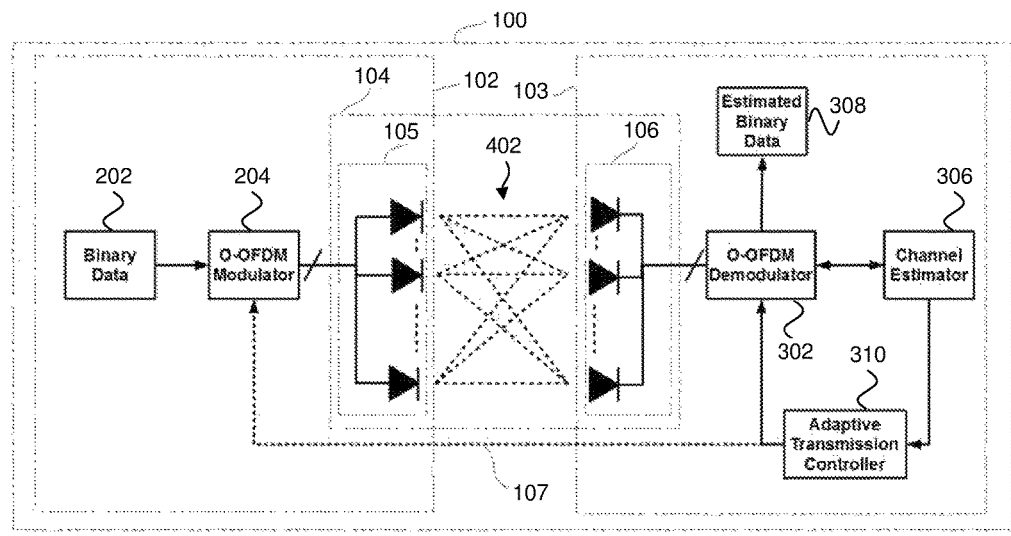
FIG. 1 illustrates an adaptive MIMO O-OFDM based VLC system in accordance with embodiments of the present disclosure.

Referring now to the figures, FIG. 1 illustrates an adaptive MIMO O-OFDM based VLC system 100 in accordance with an embodiment of the present disclosure. System 100 includes a transmitter 102, a receiver 103, an optical MIMO channel structure 104, light emitting diodes (LEDs) 105, photodetectors (PDs) 106, and a feedback channel 107. Transmitter 102 manages transmitting functions and provides illumination. Receiver 103 manages receiving functions. Optical MIMO channel structure 104 provides optical wireless connections between LEDs 105 and PDs 106. LEDs 105 provide illumination and optical data transmission. PDs 106 provide optical data reception. Feedback channel 107 is a wireless connection from receiver 103 to transmitter 102 that allows for transfer of adaptive transmission information or data.

The signal that is transmitted and/or received is an optical signal for optical communication. In contrast to RF radiation, the signal according to the invention is an optical radiation (visible) signal, which will only be receivable within the field of view of receivers. Due to this property, such signals are advantageously hard to disturb and offer physically secure and reliable data transmission and reception. Furthermore, VLC provides the dual use of LEDs for illumination purposes.

Transmitter 102 and receiver 103 include LEDs 105 and PDs 106, respectively. Each of LEDs 105 and PDs 106 may be provided in arrays in one example. Data is transmitted from multiple LEDs 105 to multiple photodetectors 106 through optical wireless channels 104 (shown by multiple dashed lines between LEDS 105 and PDs 106). The channel state information (i.e., channel coefficients, channel correlation, signal-to-noise ratio, etc.) are estimated by receiver 103. Based on channel conditions, an adaptive transmission method, which is explained in further detail with respect to FIG. 6, includes selecting the optimal transmission mode which includes modulation type, modulation order, MIMO configuration, and MIMO type. The selected transmission mode is provided to the transmitter via feedback channel 107. It is noted that the elements or components mentioned above and illustrated with respect to FIG. 1 (e.g., modulator 204) may also be referred to as different modules.

Figure 2:
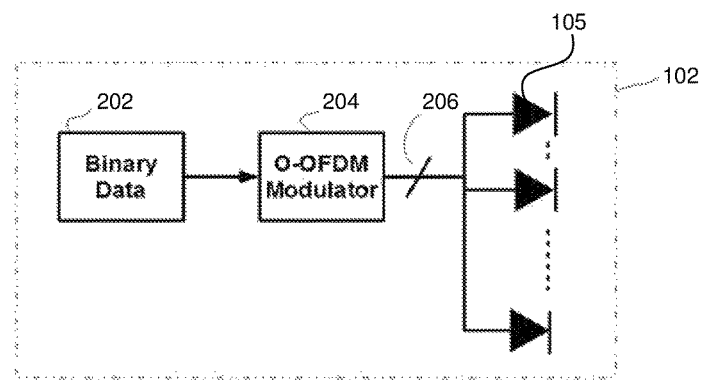
FIG. 2 illustrates a transmitter structure in accordance with embodiments of the present disclosure.

Referring now to FIG. 2, transmitter 102 for managing transmitting functions and providing illumination or light is illustrated in accordance with an embodiment of the present disclosure. Transmitter 102 includes an optical OFDM (O-OFDM) modulator 204, a cable bus 206, and transmitter LEDs 105. FIG. 2 illustrates binary data 202 (binary information which will be transmitted to the receiver side) that is sent to O-OFDM modulator 204, which processes the binary data to make it suitable for optical data transmission. Processed data from O-OFDM modulator 204 is sent to cable bus 206 that separates into independent cables for multiplexing channels, and the independent cables of cable bus 206 are operably coupled to the plurality of LEDs 105.

The binary information 202 is fed to O-OFDM modulator 204. O-OFDM modulator 204 converts the data sequence to a suitable form for optical communication with the transmission parameters determined by adaptive transmission controller 310 at receiver 103. Then, O-OFDM waveforms are fed to the LEDs 105. The LEDs 105 are connected to O-OFDM modulator 204 via separate connections so that LEDs 105 can operate independently from each other. Note that depending on the MIMO type, all the LEDs 105 can be driven by either the same or different O-OFDM waveforms.

In the invented method, all possible transmission modes are indexed in a look up table (LUT) (e.g., LUT 500 shown in FIG. 5). The transmission mode is selected based on the channel state information to maximize the pre-determined performance metric while satisfying a given constraint metric. The adaptive transmission mode indicates the MIMO configuration, MIMO type, modulation type, and modulation order and related information for resource block (RB) structures which are explained in greater detail below with respect to FIG. 6. In one example, O-OFDM modulator 204 (or transmitter 102) is informed with the index of the selected transmission mode. Therefore, channel information does not need to be known by the transmitter. It is noted that the elements or components mentioned above and illustrated with respect to FIG. 2 (e.g., demodulator 302, channel estimator 306, adaptive transmission controller 310) may also be referred to as different modules.

Figure 3:
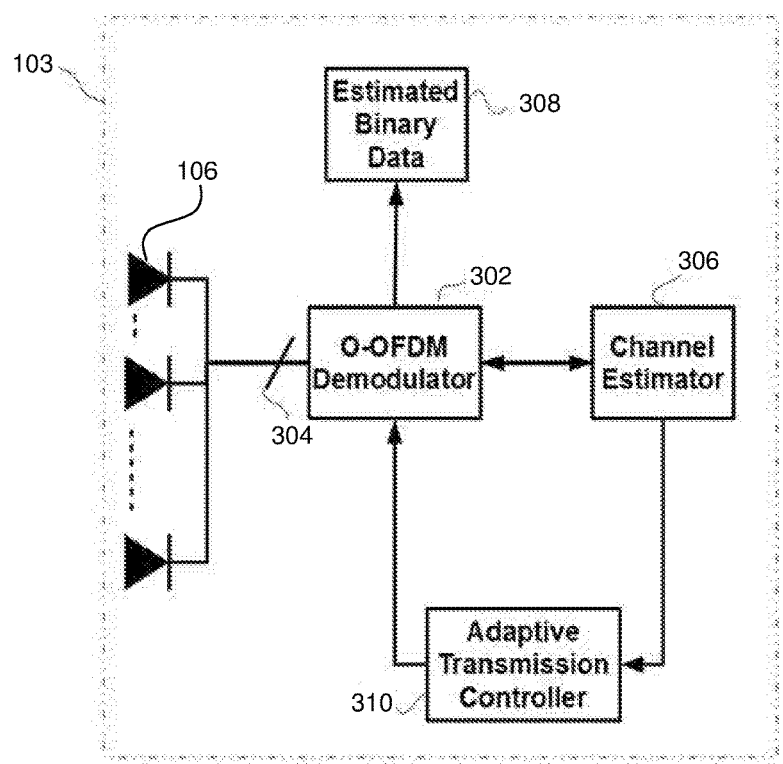
FIG. 3 illustrates a receiver structure in accordance with embodiments of the present disclosure.

Referring now to FIG. 3, receiver 103 for managing receiving functions is illustrated in accordance with an embodiment of the present disclosure. Receiver 103 includes an O-OFDM demodulator 302 which processes the received signal to estimate the transmitted information, a cable bus 304 which bundles several independent cables coupled to the plurality of PDs 106, a channel estimator 306 which estimates channel information (e.g., channel coefficients, channel correlation, signal-to-noise ratio, and the like), and an adaptive transmission controller 310 which determines adaptive parameters (MIMO configuration, MIMO type, modulation type, and modulation order) and manages bit-loading.

PDs 106 are operably coupled to O-OFDM demodulator 302 via cable bus 304 that bundles separate connections or cables coupled to PDs 106. Depending on the MIMO type, the signals received by different PDs are combined at demodulator 302 and binary message information 308 is recovered. Channel estimator 306 is operably coupled to demodulator 302 and provides the estimated values of channel coefficients, channel correlation, signal-to-noise ratio, and the like, to the O-OFDM demodulator 302 and adaptive transmission controller 310 (the function of controller 310 is explained in greater detail below with respect to FIG. 6). It is noted that the elements or components mentioned above and illustrated with respect to FIG. 3 may also be referred to as different modules.

Figure 4:
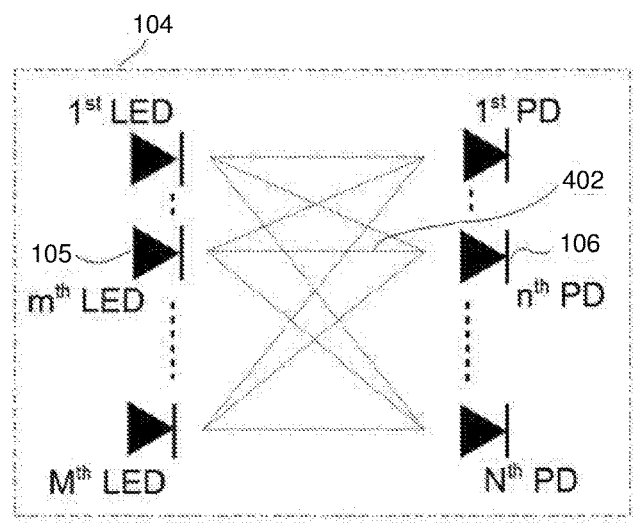
FIG. 4 illustrates an optical MIMO channel structure in accordance with embodiments of the present disclosure.

Referring now to FIG. 4, optical MIMO channel structure 104 is illustrated in accordance with embodiments of the present disclosure. Optical MIMO channel structure 104 includes a plurality of LEDs 105 for illumination and optical data transmission and a plurality of PDs 106 for optical data reception. Optical wireless connections 402 for data transmission are illustrated between LEDs 105 and PDs 106.

In FIG. 4, an optical wireless channel among each $m^{th}$ LED and $n^{th}$ PD is illustrated. There are a total of M LEDs at the transmitter side and a total of N PDs at the receiver side. Therefore, there is a total of M×N optical downlink channels available. The optical channel 402 between the $m^{th}$ LED and the $n^{th}$ PD may be denoted by $h_{mn}(t)$ as a function of time t. Additionally, its discrete frequency response may be denoted by $H_{mn}[k]$ as a function of the $k^{th}$ subcarrier. It is noted that the elements or components mentioned above and illustrated with respect to FIG. 4 may also be referred to as different modules.

Referring now to FIG. 5, a look-up table (LUT) 500 is shown in accordance with an embodiment of the present disclosure. LUT 500 includes combinations of adaptive transmission parameters including a) a MIMO configuration, b) MIMO type, c) modulation type, and d) modulation (constellation) order, and their performance and constraint metrics.

An adaptive transmission mode identifier 502 is a numeric value for identifying a particular combination of adaptive transmission parameters. A MIMO configuration 504 is a parameter that shows the available MIMO configurations in a system consisting of M LEDs and N PDs (includes single-input single-output (SISO) configuration; i.e., M=N=1 as a special case). A MIMO type 506 is a MIMO parameter that shows available MIMO structure in the system such as repetition code (RC), spatial multiplexing (SMUX), and spatial modulation (SMUD). It is noted that RC, SMUX, and SMUD are only three examples of MIMO type and the invention is not limited thereto. Various other MIMO techniques may be supported. A modulation type 508 is a parameter that shows the available modulation types, such as phase shift keying (PSK) and quadrature amplitude modulation (QAM). It is noted that PSK and QAM are only two examples of modulation type and the invention is not limited thereto. Various other linear modulation techniques may be supported. A modulation order 510 is a parameter that shows the available orders of modulation types which are typically an order of two (2, 4, 8, . . . ), but other integer values can be used. A performance metric 512 is a metric that shows the performance value of a defined combination including specific MIMO configuration 504, MIMO type 506, modulation type 508, and modulation order 510. For example, capacity, spectral efficiency, throughput, data rate, bit error rate, combinations thereof, and the like can be chosen as performance metrics. A constraint metric 514 is a metric that shows the constraint parameter value of a defined combination including specific MIMO configuration 504, MIMO type 506, modulation type 508, and modulation order 510. For example, bit error rate, symbol error rate, outage probability, data rate, combinations thereof, and the like can be chosen as constraint metrics.

Each adaptive transmission mode (indicated by indicator 502) is a combination of at least MIMO configuration 504, MIMO type 506, modulation type 508, and modulation order 510. For a given number of LEDs and PDs in an environment, all possible combinations of MIMO (LED-PD) configurations and MIMO type (for example, repetition code (RC), spatial multiplexing (SMUX), and spatial modulation (SMUD)) are listed in a look-up table (LUT), as shown for example in LUT 500 of FIG. 5. For instance, if there are 2 LEDs and 2 PDs, the possible configurations are 1×1 (with four options), 1×2 (with two options), 2×1 (with two options) and 2×2. Modulation types and modulation order are the possible symbol mapping methods. These may include any linear modulation technique (PSK and QAM are examples) with any desired modulation order (size).

Numerous transmission modes can be defined using the look up table in FIG. 5. The defined transmission modes are identified by a numeric value (identifier 502). In order to compare the transmission modes with each other, a performance metric (512) and a constraint metric (514) is defined.

Figure 6:
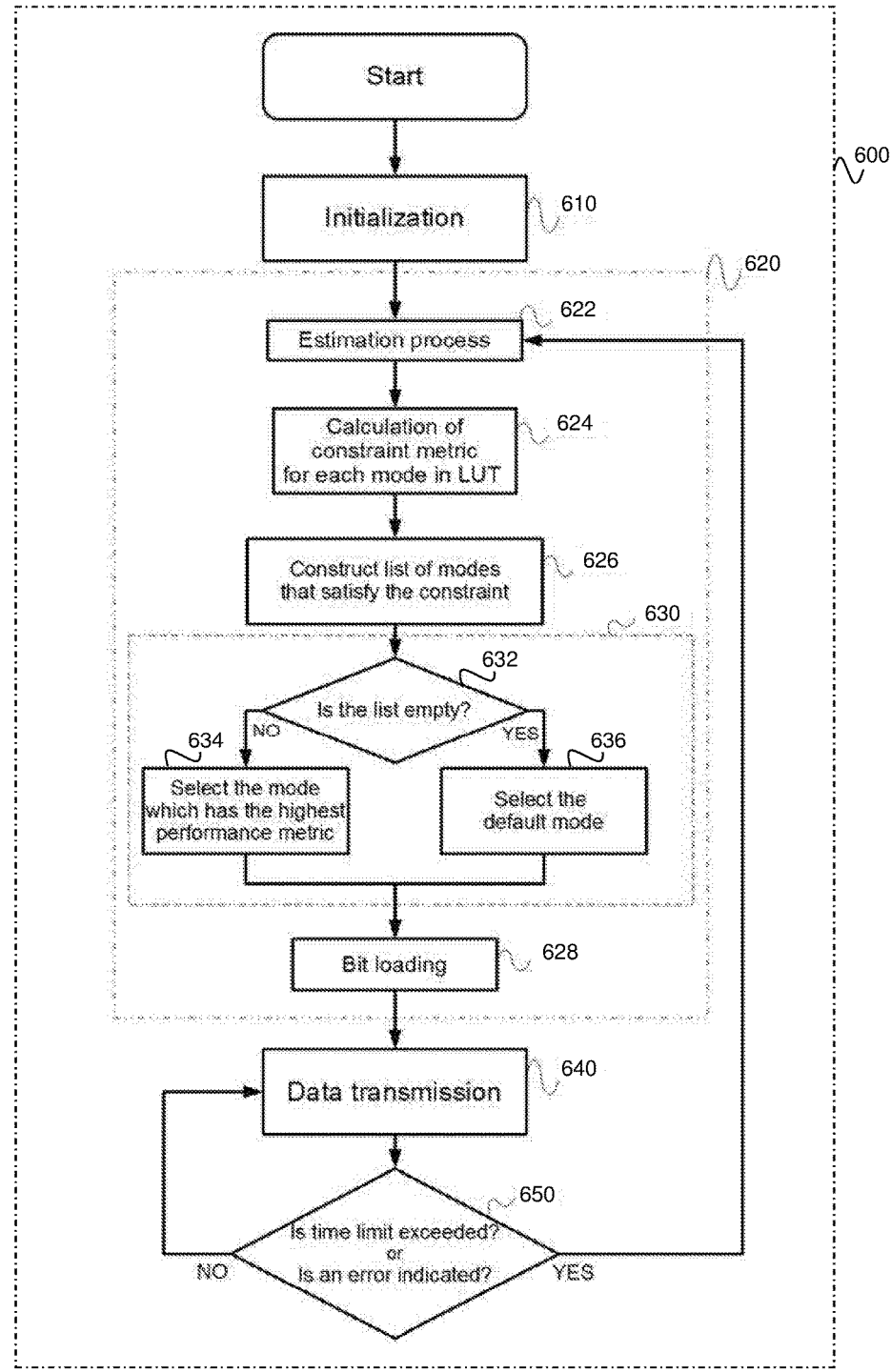
FIG. 6 illustrates a method of adaptive transmission in accordance with embodiments of the present disclosure.

Referring now to FIG. 6, a method of adaptive transmission 600 is illustrated in accordance with embodiments of the present disclosure. Method 600 includes initialization at block 610, adaptive selection of a transmission mode at blocks within process 620, and data transmission at block 640. Adaptive selection of a transmission mode in process 620 further includes an estimation process at block 622, calculation of a constraint metric at block 624, comparison and construction of a list of modes that satisfy the constraint metric at block 626, determination of adaptive transmission types at blocks within process 630, and bit loading at block 628.

Initialization at block 610 includes a period for constructing a look-up table (an example is shown in FIG. 5) with possible outcomes of MIMO configuration, MIMO type, modulation type, and modulation order, setting performance metrics, and arranging resource blocks. In one example, information from O-OFDM modulator 204, O-OFDM demodulator 302, and adaptive transmission controller 310 may be used in initialization at block 610.

Adaptive selection of transmission mode at blocks within process 620 includes processes to determine adaptive transmission parameters. Estimation process at block 622 includes transmission of pilot symbols and estimation of channel state information (such as channel coefficients, channel correlations, signal-to-noise-ratio, and the like). O-OFDM modulator 204, optical wireless channels 402, and O-OFDM demodulator 302 are involved in the transmission of pilot symbols. O-OFDM demodulator 302 and channel estimator 306 are involved in estimation of channel state information. Calculation of a constraint metric at block 624 includes calculating a constraint metric of each transmission mode in the LUT. Comparison and construction of a list of modes that satisfy the constraint metric at block 626 includes comparing the constraint metric values from block 624 with targeted values and constructing a list of modes that satisfy the constraints. Blocks 624 and 626 involving calculation of constraint metrics and constructing a list of transmission modes that satisfy the constraints, blocks 632-636, and block 628 are performed at least in part by adaptive transmission controller 310.

Determination or selection of an adaptive transmission mode at blocks within process 630 includes selecting the mode which has the highest performance metric among the available modes that satisfy the constraint metrics. A decision block at block 632 determines if a list of modes that satisfy the constraints from block 626 is empty. If the list is not empty (NO), method 600 continues with selecting the mode which has the highest performance metric at block 634. If the list is empty (YES), method 600 continues with selecting a default mode at block 636.

Bit loading at block 628 includes rearranging modulation order on each resource block with respect to the selected modulation order from the selected adaptive transmission mode from process 630, and may take into consideration attenuation on each subcarrier for further performance improvement.

Data is transmitted from LEDs 102 at block 640 according to the determined adaptive transmission parameters of the selected adaptive transmission mode.

Method 600 further includes a decision block at block 650 which checks if a time limit for data transmission is exceeded or if a data transmission error is detected. If NO, then data transmission at block 640 is repeated. If YES, then method 600 loops to an estimation process at block 622.

Updating the transmission structure of the transmitter 102 and the receiver 103 involves adaptive transmission controller 310, feedback channel 107, O-OFDM modulator 204, and O-OFDM demodulator 302.

In the initialization phase (block 610), method 600 includes constructing an LUT with possible MIMO configurations, MIMO types, modulation types, and modulation size, and determining RBs. Also, performance and constraint metrics (such as bit-error-rate, symbol error rate, outage probability, throughput, data rate, spectral efficiency, capacity, signal-to-noise-ratio, signal-to-interference-and-noise-ratio, etc.) are specified in this phase. Adaptive transmission mode selection (blocks within process 620) includes processes that determine the transmission mode based on the channel state information.

After the transmission mode is specified, its adaptive transmission mode index value (e.g., adaptive transmission mode indicator 502) is sent to the transmitter and data transmission starts (block 640). At the receiver side at block 650, a timer to control the channel coherence time and an indicator to check detection and estimation processes with some specified metric (such as packet error rate) exist. If coherence time exceeds or indicator shows an error, the transmission mode selection process is repeated and data transmission is started with the updated transmission mode.

In order to determine the transmission mode (blocks within process 620), channel state information is required. For channel estimation purposes, pilot symbols which are multiplexed with data signals and known to the receiver are used (block 622). In the transmission of pilot symbols, pre-determined modulation type, modulation order, and MIMO type are used. Additionally, all the LEDs and PDs are used to have estimates for all MxN channels. At the receiver side, channel estimator 306 forwards the estimated information (such as channel coefficients, channel correlations, signal-to-noise-ratios, etc.) to O-OFDM demodulator 302 and adaptive transmission controller 310. Adaptive transmission controller evaluates (block 624) the constraint metric for each mode in LUT and compares it with a target value(s) and decides whether the modes satisfy the constraint or not. Then, the modes which satisfy the constraint are listed (block 626), and the one which yields the highest performance metric is selected (block 634). If any of the adaptive transmission modes does not satisfy the constraint metric, a default mode which is decided during the initialization phase is selected (block 636). At the end of these processes, to further improve system performance, bit loading may be performed (block 628). In this stage, modulation orders are re-arranged with respect to resource block based frequency selective characteristics of sub-channels (subcarriers). For instance, the resource blocks with subcarriers that have high attenuation are re-modulated with lower modulation orders than selected modulation order in previous stage and similarly, the resource blocks with subcarriers that have low attenuation are re-modulated with higher modulation orders. The adaptive transmission information (i.e., selected mode) and resource block based modulation orders are forwarded to both O-OFDM demodulator 302 and modulator 204 through feedback uplink channel 107.

The system of the present disclosure works with various O-OFDM types such as ACO-OFDM, DCO-OFDM, unipolar OFDM (U-OFDM) and enhanced U-OFDM (eU-OFDM). Additionally, it supports coded and uncoded modulation types.

Figure 7:
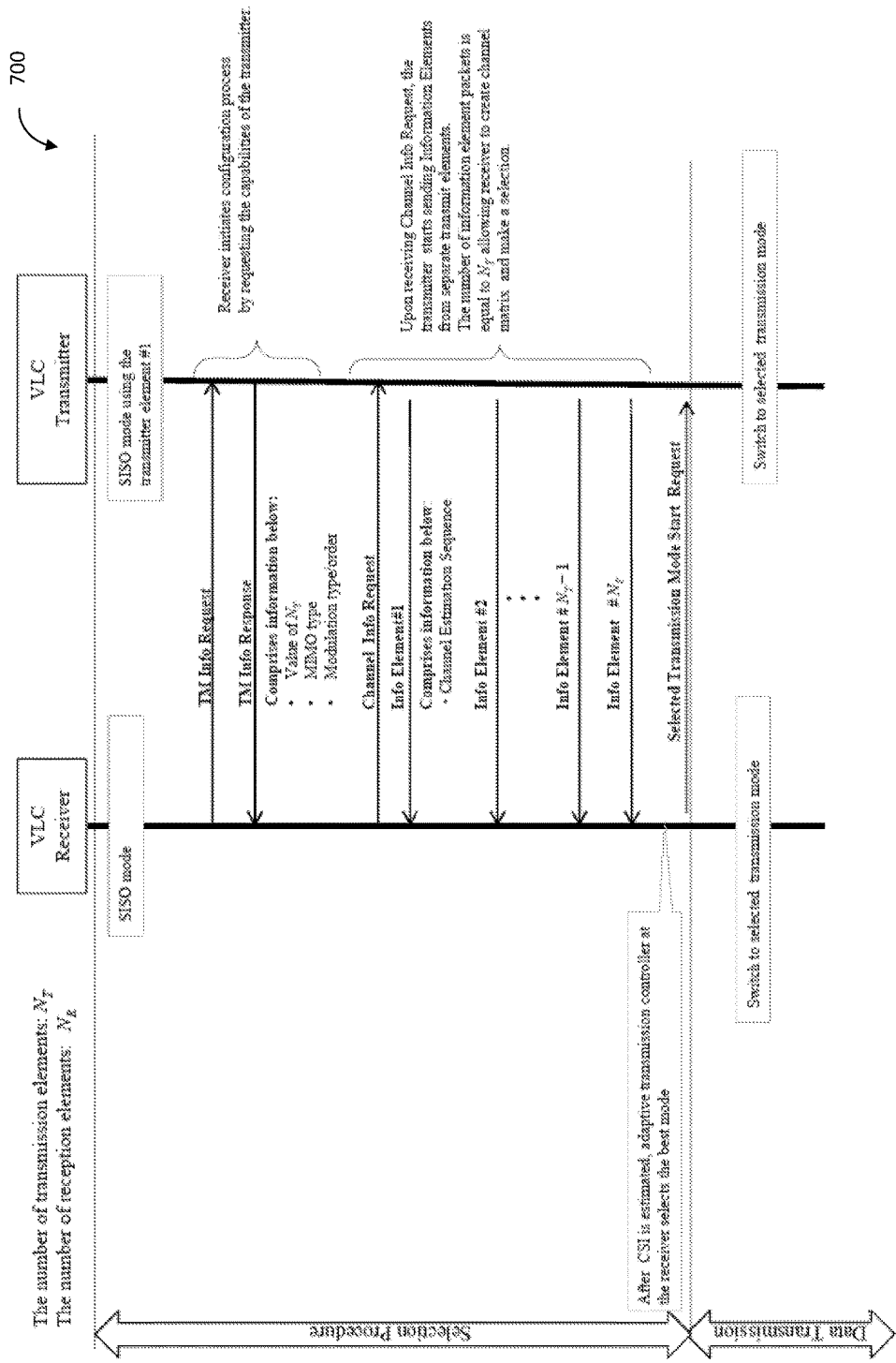
FIG. 7 illustrates a sequence chart in accordance with embodiments of the present disclosure.

Referring now to FIG. 7, an example sequence chart 700 is illustrated in accordance with embodiments of the present disclosure.

Figure 8:
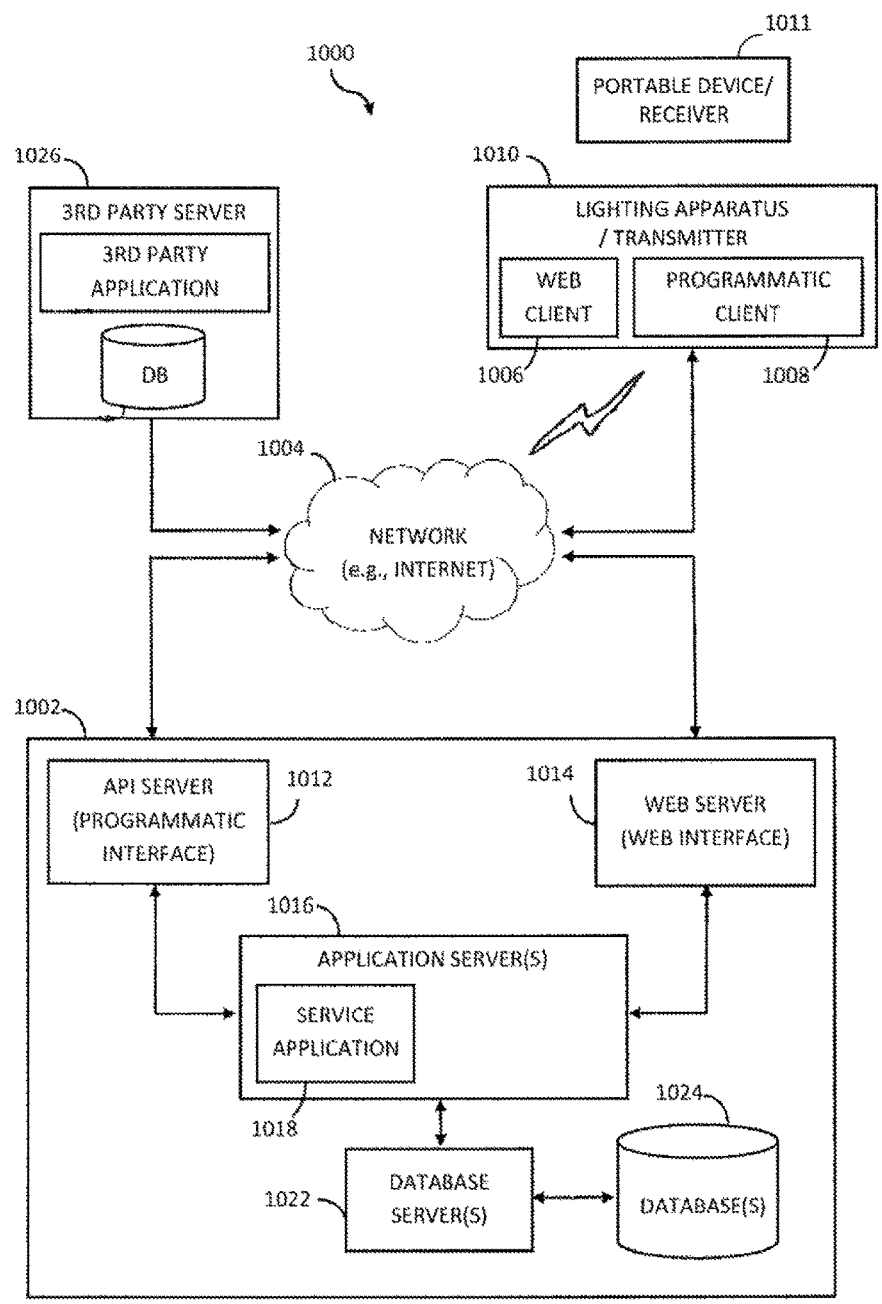
FIG. 8 illustrates a network diagram depicting an example system for performing VLC according to some embodiments of the present disclosure.

Referring now to FIG. 8, a network diagram depicts an example system 1000 for performing controlled VLC according to some embodiments of the present disclosure. A networked system 1002 forms a network-based control system that provides server-side functionality, via a network 1004 (e.g., the Internet or Wide Area Network (WAN)), to one or more clients and devices. FIG. 8 further illustrates, for example, one or both of a web client 1006 (e.g., a web browser) and a programmatic client 1008 executing on device machines 1010, 1011 (e.g., a transmitter and a receiver) which may be mounted in a lighting apparatus according to any of the embodiments noted above. In one embodiment, the system 1000 comprises a lighting and controlled access point system.

Device machine 1010 may comprise a computing device that includes at least communication capabilities with the network 1004 to access the networked system 1002. Device machine 1010 may connect with the network 1004 via a wired or wireless connection and device machine 1011 may operably connect with device machine 1010 by VLC as described above to access network 1004. For example, one or more portions of network 1004 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

An Application Program Interface (API) server 1012 and a web server 1014 are coupled to, and provide programmatic and web interfaces respectively to, one or more application servers 1016. The application servers 1016 may host one or more "lighting applications" (e.g., VLC service application 1018) in accordance with an embodiment of the present invention. Application servers 1016 may further include payment applications and other applications that support a lighting service. The application servers 1016 are, in turn, shown to be coupled to one or more databases servers 1022 that facilitate access to one or more databases 1024.

While the lighting application 1018 is shown in FIG. 8 to form part of the networked system 1002, it will be appreciated that, in alternative embodiments, the lighting application may form part of a lighting application service that is separate and distinct from the networked system 1002 or separate and distinct from one another. In other embodiments, the lighting service application 1018 may be omitted from the system 1000. In some embodiments, at least a portion of the lighting applications may be provided on the device machine 1010.

Further, while the system 1000 shown in FIG. 8 employs a client-server architecture, embodiments of the present disclosure is not limited to such an architecture, and may equally well find application in, for example, a distributed or peer-to-peer architecture system. The various service applications 1018 may also be implemented as standalone software programs, which do not necessarily have networking capabilities.

The web client 1006 accesses the various lighting applications 1018 via the web interface supported by the web server 1014. Similarly, the programmatic client 1008 accesses the various services and functions provided by the applications 1018 via the programmatic interface provided by the API server 1012.

The systems, apparatus, and methods according to example embodiments of the present invention may be implemented through one or more processors, servers, and/or client computers in operable communication with one another.

Figure 9:
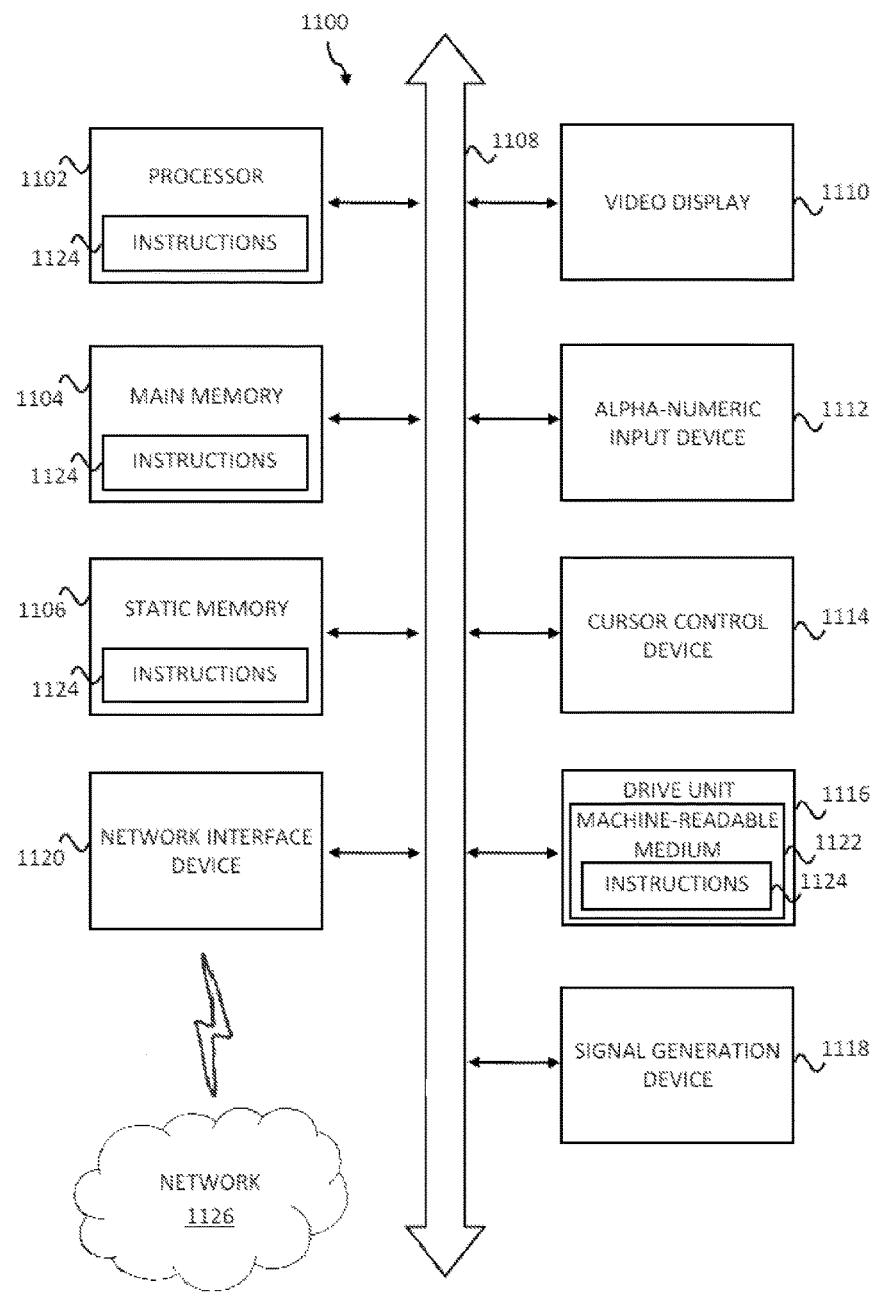
FIG. 9 illustrates a diagrammatic representation of a machine in the example form of a computer system, within which a set of instructions may be carried out for causing a lighting apparatus to perform any one or more of the VLC methods according to some embodiments of the present disclosure.

FIG. 9 illustrates a diagrammatic representation of a machine 1100 in the example form of a computer system, within which a set of instructions may be carried out for causing a lighting apparatus to perform any one or more of the methods according to some embodiments of the present invention.

The computer system 1100 or parts thereof may comprise, for example, all or part of the device machines 1010, 1011, applications servers 1016, API server 1012, web server 1014, database servers 1022, or third party server 1026. In alternative embodiments, the machine operates as a standalone device or may be connected (e.g., networked) to other machines. In a networked deployment, the machine may operate in the capacity of a server or a device machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104 and a static memory 1106, which communicate with each other via a bus 1108. The computer system 1100 may further include a video display unit 1110 (e.g., liquid crystal display (LCD), inorganic/organic light emitting diode (LED/OLED), touch screen, or a cathode ray tube (CRT)). The computer system 1100 also includes an alphanumeric input device 1112 (e.g., a physical or virtual keyboard), a cursor control device 1114 (e.g., a mouse, a touch screen, a touchpad, a trackball, a trackpad), a disk drive unit 1116, a signal generation device 1118 (e.g., a speaker) and a network interface device 1120.

The disk drive unit 1116 includes a machine-readable medium 1122 on which is stored one or more sets of instructions 1124 (e.g., software) embodying any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment.

Embodiments of the present invention may be embodied as a system, method, or computer program product (e.g., embodiments directed toward a VLC system, method, or computer program product). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". For example, a VLC method may be embodied in a software and hardware system that can be housed in a portable device such as a tablet, laptop, camera, phone, and the like. In another example, a client and server computer in operable communication and combination, may be in its entirety said to be embodied in a system. Furthermore, aspects of the present embodiments of the disclosure may take the form of a computer program product embodied in one or more computer readable medium/media having computer readable program code embodied thereon. Methods may be implemented in a special-purpose computer or a suitably programmed general-purpose computer.

Any combination of one or more computer readable medium/media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described above with reference to flowchart illustrations and/or block diagrams of methods, apparatus (systems) and computer program products according to embodiments of the present invention (e.g., FIGS. 1-9). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the invention has been described in detail in connection with only a limited number of embodiments, it should be readily understood that the invention is not limited to such disclosed embodiments. Rather, the invention can be modified to incorporate a number of variations, alterations, substitutions, combinations or equivalent arrangements not heretofore described, but which are commensurate with the spirit and scope of the invention. Furthermore, the various components of the system, apparatus, and methods disclosed above can be alternatives which may be combined in various applicable and functioning combinations within the scope of the present invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

We claim:

1. A visible light communication (VLC) transmitter, comprising:
    an optical orthogonal frequency division multiplexing (O-OFDM) modulator configured to process digital data;
    a plurality of light emitting diodes (LEDs) operably coupled to the O-OFDM modulator, the plurality of LEDs configured to transmit the processed digital data to a plurality of photodetectors (PDs) at a receiver; and
    a feedback channel operably coupled to the O-OFDM modulator, the feedback channel configured to receive feedback data from an adaptive transmission controller at the receiver, the feedback data including an optimized adaptive transmission mode indicator identifying a combination of adaptive transmission parameters including at least multiple input multiple output (MIMO) configuration, MIMO type, modulation type, and modulation order.

2. The VLC transmitter according to claim 1, wherein the MIMO configuration is selected from different combinations of one or more LEDs and one or more PDs.

3. The VLC transmitter according to claim 1, wherein the MIMO type is selected from the group consisting of repetition code (RC), spatial multiplexing (SMUX), and spatial modulation (SMUD).

4. The VLC transmitter according to claim 1, wherein the modulation type is selected from the group consisting of phase shift keying (PSK) and quadrature amplitude modulation (QAM).

5. The VLC transmitter according to claim 1, wherein the modulation order is an integer value.

6. A visible light communication (VLC) receiver, comprising:
    a plurality of photodetectors (PDs) configured to receive analog data from a plurality of light emitting diodes (LEDs) at a transmitter;
    an optical orthogonal frequency division multiplexing (O-OFDM) demodulator operably coupled to the plurality of PDs, the O-OFDM configured to process the received analog data;
    a channel estimator operably coupled to the O-OFDM demodulator, the channel estimator configured to estimate channel state information;
    an adaptive transmission controller operably coupled to the O-OFDM demodulator and the channel estimator, the adaptive transmission controller configured to provide feedback data; and
    a feedback channel operably coupled to the O-OFDM modulator, the feedback channel configured to transfer feedback data from the adaptive transmission controller, the feedback data including an optimized adaptive transmission mode indicator identifying a combination of adaptive transmission parameters including at least multiple input multiple output (MIMO) configuration, MIMO type, modulation type, and modulation order.

7. The VLC receiver according to claim 6, wherein the channel state information is selected from the group consisting of channel coefficients, channel correlation, and signal-to-noise ratio.

8. The VLC receiver according to claim 6, wherein the MIMO configuration is selected from different combinations of one or more LEDs and one or more PDs.

9. The VLC receiver according to claim 6, wherein the MIMO type is selected from the group consisting of repetition code (RC), spatial multiplexing (SMUX), and spatial modulation (SMUD).

10. The VLC receiver according to claim 6, wherein the modulation type is selected from the group consisting of phase shift keying (PSK) and quadrature amplitude modulation (QAM).

11. The VLC receiver according to claim 6, wherein the modulation order is an integer value.

12. A method of data transmission via visible light communication (VLC), the method comprising:
    constructing a look-up table with adaptive transmission modes, each adaptive transmission mode including a combination of adaptive transmission parameters including at least multiple input multiple output (MIMO) configuration, MIMO type, modulation type, and modulation order;
    setting a performance metric for each of the possible adaptive transmission modes;
    estimating channel state information;
    setting a constraint metric for each of the possible adaptive transmission modes based at least in part on the channel state information;
    constructing a list of adaptive transmission modes that each satisfy a respective constraint metric;
    selecting the adaptive transmission mode with the highest performance metric; and
    providing feedback data from a receiver to a transmitter, the feedback data including an optimized adaptive transmission mode indicator identifying the selected adaptive transmission mode with the highest performance metric.

13. The method according to claim 12, wherein estimating channel state information includes estimating information selected from the group consisting of channel coefficients, channel correlation, signal-to-noise ratio, and a combination thereof.

14. The method according to claim 12, wherein the MIMO configuration is selected from different combinations of one or more LEDs and one or more PDs.

15. The method according to claim 12, wherein the MIMO type is selected from the group consisting of repetition code (RC), spatial multiplexing (SMUX), and spatial modulation (SMUD).

16. The method according to claim 12, wherein the modulation type is selected from the group consisting of phase shift keying (PSK) and quadrature amplitude modulation (QAM).

17. The method according to claim 12, wherein the modulation order is an integer value.

18. The method according to claim 12, wherein the performance metric is selected from the group consisting of capacity, spectral efficiency, throughput, data rate, bit error rate, and a combination thereof, and wherein the constraint metric is selected from the group consisting of bit error rate, symbol error rate, outage probability, data rate, and a combination thereof.

* * * * *